(12) United States Patent
Walck et al.

(10) Patent No.: US 6,450,655 B1
(45) Date of Patent: Sep. 17, 2002

(54) MULTI-PORT ILLUMINATING AND VIEWING UNIT

(75) Inventors: Gary Walck, Niagara Falls; Richard Marinelli, Tonawanda, both of NY (US)

(73) Assignee: J.M. Canty Inc, Lockport, NY (US)

( * ) Notice: Subject to any disclaimer, the term of this patent is extended or adjusted under 35 U.S.C. 154(b) by 53 days.

(21) Appl. No.: 09/727,649

(22) Filed: Dec. 1, 2000

(51) Int. Cl.[7] .............................. G03B 15/02; F17C 1/00
(52) U.S. Cl. ............................................. 362/3; 362/562
(58) Field of Search .............................. 362/3, 11, 562, 362/551, 554, 558, 572, 574, 575, 101; 356/239.2, 239.5, 239.6, 394; 348/82, 83, 370, 371; 396/17

(56) References Cited

U.S. PATENT DOCUMENTS

| | | | |
|---|---|---|---|
| 4,219,013 A | * | 8/1980 | Okada ............................ 396/17 |
| 4,977,418 A | * | 12/1990 | Canty ............................ 348/82 |
| 5,230,556 A | * | 7/1993 | Canty et al. ................... 362/3 |
| 5,450,291 A | * | 9/1995 | Kumagai ........................ 362/3 |

FOREIGN PATENT DOCUMENTS

JP 60118829 * 6/1985 ...................... 362/3

* cited by examiner

*Primary Examiner*—Y. My Quach-Lee
(74) *Attorney, Agent, or Firm*—James Ralabate

(57) ABSTRACT

An illuminating and viewing unit for illuminating the interior of a vessel with source radiation and observing the vessel interior comprises a housing including a front wall facing the vessel interior. The front wall is of a material that does not transmit the source radiation, and includes one or more illumination ports individually fused into the front wall that transmit the source radiation to the vessel interior. A detection port is also individually fused into the front wall for transmitting detectable radiation along a detection path from the vessel interior to a radiation detector mounted in the housing. The optical isolation of the illumination and detection ports in the front wall prevents unwanted internal reflection of source radiation into the detection path, and allows for independent selection of port materials and configurations, while maintaining a hermetic seal between the housing and the internal contents of the vessel.

9 Claims, 3 Drawing Sheets

MULTI-PORT ILLUMINATING AND VIEWING UNIT

BACKGROUND OF THE INVENTION

1. Field of the Invention

The present invention relates to devices for observing the interior contents of a vessel, and more particularly to an illuminating and viewing unit having a plurality of isolated, individually fused ports for improved illumination and viewing of the interior contents of a vessel.

2. Description of the Related Art

It is known to use various devices for direct or remote viewing of the interior of a pressure vessel, reaction vessel, or the like. A simple device for this purpose is a transparent viewing window provided in a wall of the vessel. By looking through this window, an operator can observe liquid levels, color changes, and other visually determinable factors taking place within the vessel. Several of these viewing windows are disclosed in U.S. Pat. Nos. 2,744,487; 3,299,851; 3,837,226; and 4,245,566. One problem associated with these viewing windows is that a lack of illumination within the vessel hinders observation of the vessel contents. Another serious drawback to the use of these viewing windows is the possibility that the window could fail or rupture, especially when subjected to high pressures and/or high temperatures over time. Personnel using or in the vicinity of such a window could be seriously injured if the window fails to withstand internal pressure generated within the vessel.

To overcome the problem of illumination, Thomas Canty invented a light pipe device as described in U.S. Pat. No. 4,746,178 for illuminating the interior of a pressure vessel. The device comprises a housing containing a fiber optic rod running from an external light source to a fused glass, laminated barrier disc. The unit is securely mounted on the vessel apart from a separate viewing window, with the barrier disc being arranged adjacent the interior of the vessel, whereby source light is transmitted to illuminate the vessel contents. Although this advancement significantly helps with viewing, it requires another separate aperture through the vessel wall for illumination in addition to that provided for viewing.

With regard to solving the above-mentioned safety concerns, U.S. Pat. No. 4,809,862 to Canty provides a safety viewing window comprising a transparent disc fused to a metal frame, and a laminated coating on the fused disc and frame to provide a corrosion resistant viewing window. This design has gained widespread acceptance for "in person" visual observation purposes, however it does not address the need for a camera observation unit that would enable a process to be monitored from a remote location and allow images of the process to be recorded.

Inspection units having camera means are taught in U.S. Pat. Nos. 4,965,601 and 4,977,418, also to Canty. In the former patent, a camera unit for high pressure/temperature applications comprises a CCD camera threadably connected to a fixed lens through a lens fitting. The lens fitting is fixed within a threaded attachment plug which mates with a threaded aperture in a vessel. A fused lens is provided at the front of the attachment plug, and is preferably overcoated with a protective laminate. The latter patent discloses a camera viewing unit including a CCTV camera mounted within a hermetically-sealed housing for axially directed adjustment relative to a fixed lens. A fused lens laminated with a protective overcoating is provided at the front of the housing. The camera units of U.S. Pat. Nos. 4,965,601 and 4,977,418 offer a means for safely monitoring vessel contents from a remote location with recording and playback capabilities. However, as with the simple viewing windows of the prior art, the crucial problem of illumination was treated separately, such that illumination and viewing were directed along different axes and optimum viewing could not be achieved.

Subsequently, illumination means and camera viewing means were combined in the same unit according to U.S. Pat. No. 5,230,556 to Canty et al. The described lighting and viewing unit includes a hermetically-sealed housing having a front fused glass window overcoated with a protective laminate, optical fibers extending from an external light source through the housing to the fused glass window, and a camera mounted within the housing with a camera lens fixed closely adjacent the fused glass window. A problem recognized in the development of this combined illumination/viewing unit involves washout due to internal reflection of illumination light by the fused glass window and/or the protective laminate back toward the camera lens. This problem is particularly noticeable with respect to wide-angle illumination and viewing arrangements involving significantly divergent rays. The reflected light causes the camera shutter to close down, resulting in an image of the vessel interior that is much dimmer than it may well be. This can compromise the image quality to the point where any internal vessel details are not visible.

The '556 patent offers two ways of alleviating this problem. First, at column 8, lines 40–46, it suggests separating the optical fibers from the camera lens by a distance sufficient to minimize the amount of internally reflected light reaching the camera lens. Separation ensures that only higher order reflections, which have much less effect on the detected image, are introduced into the camera lens. This approach introduces limitations to the system because as the overall surface area of the front window is increased to accommodate greater spacing, the pressure rating of the unit decreases. Also, a distance between the illuminating optical fibers and the camera lens that is sufficient for one level of illumination light flux may not be sufficient for an increased level of illumination light flux. Ultimately, restrictions on viewing angle of the camera lens, pressure rating of the unit, and/or the vessel aperture size into which the unit fits must be accepted.

A second solution to the problem of reflection washout is discussed at column 8, lines 52–65. This approach involves providing an opaque ring embedded within the fused glass window and directing the optical fibers outside the ring and the camera lens inside the ring. Although suitable for many applications, this type of unit is limited in pressure rating because it relies on a single large fused glass window. Moreover, the thickness and optical nature of the window and laminate encountered by the illuminating light is necessarily the same as that encountered by light passing from the interior of the vessel to the camera lens, a restriction which may be undesirable in certain applications. Finally, the ring restricts wide-angle illuminating patterns and wide-angle viewing.

BRIEF SUMMARY OF THE INVENTION

It is therefore an object of the present invention to provide a combined illuminating and viewing unit for pressure vessels wherein a camera or other radiation detector of the unit is free of washout problems due to internally reflected illuminating radiation.

It is another object of the present invention to provide an illuminating and viewing unit wherein illuminating radiation passes through one or more illumination ports that are independent in thickness, size, shape, and transmissive nature from a detection port through which detectable radiation passes to a camera lens.

It is a further object of the present invention to provide an illuminating and viewing unit that is suitable for wide-angle illumination of vessel contents.

It is a further object of the present invention to provide an illuminating and viewing unit that is suitable for wide-angle detection of radiation coming from the interior of a vessel.

It is a further object of the present invention to provide an illuminating and viewing unit that allows for significantly higher pressure retention capability when installed into a pressure retaining vessel.

It is a further object of the present invention to provide an illuminating and viewing unit that, due to reduction in port size and higher window strength, exhibits a greater resistance to thermal shock failure accompanied by loss in pressure retention ability of the vessel.

It is a further object of the present invention to provide an illuminating and viewing unit that fits in a smaller vessel aperture than previously obtainable without deleterious effect on the detected image.

These and other objects are realized in an illuminating and viewing unit of the present invention. In a preferred embodiment, the illuminating and viewing unit generally comprises a hermetically-sealed housing containing at least one radiation guide, such as a plurality of optical fibers running from an external or internal light source, and a radiation detector, such as a CCD camera. In accordance with the present invention, one or more illumination ports are individually fused within a radiation non-transmitting front wall of the housing that faces the vessel interior, and a detection port is also individually fused within the front wall. The illumination ports transmit source radiation carried by the radiation guides to the vessel interior, and the detection port transmits detectable radiation from the interior of the vessel along a detection path leading to the radiation detector. Because the illumination and detection ports are individually fused within the front wall of the unit housing, problems associated with source radiation being internally reflected into the detection path are prevented. Thus, the present invention greatly improves wide-angle illumination and wide-angle viewing capabilities relative to illuminating and viewing units of the prior art.

Moreover, this improvement is achieved without restricting pressure rating and size selection of the unit.

BRIEF DESCRIPTION OF THE SEVERAL VIEWS OF THE DRAWINGS

The nature and mode of operation of the present invention will now be more fully described in the following detailed description of the preferred embodiment taken with the accompanying drawing figures, in which.

DETAILED DESCRIPTION OF THE PREFERRED EMBODIMENTS

Figure 1:
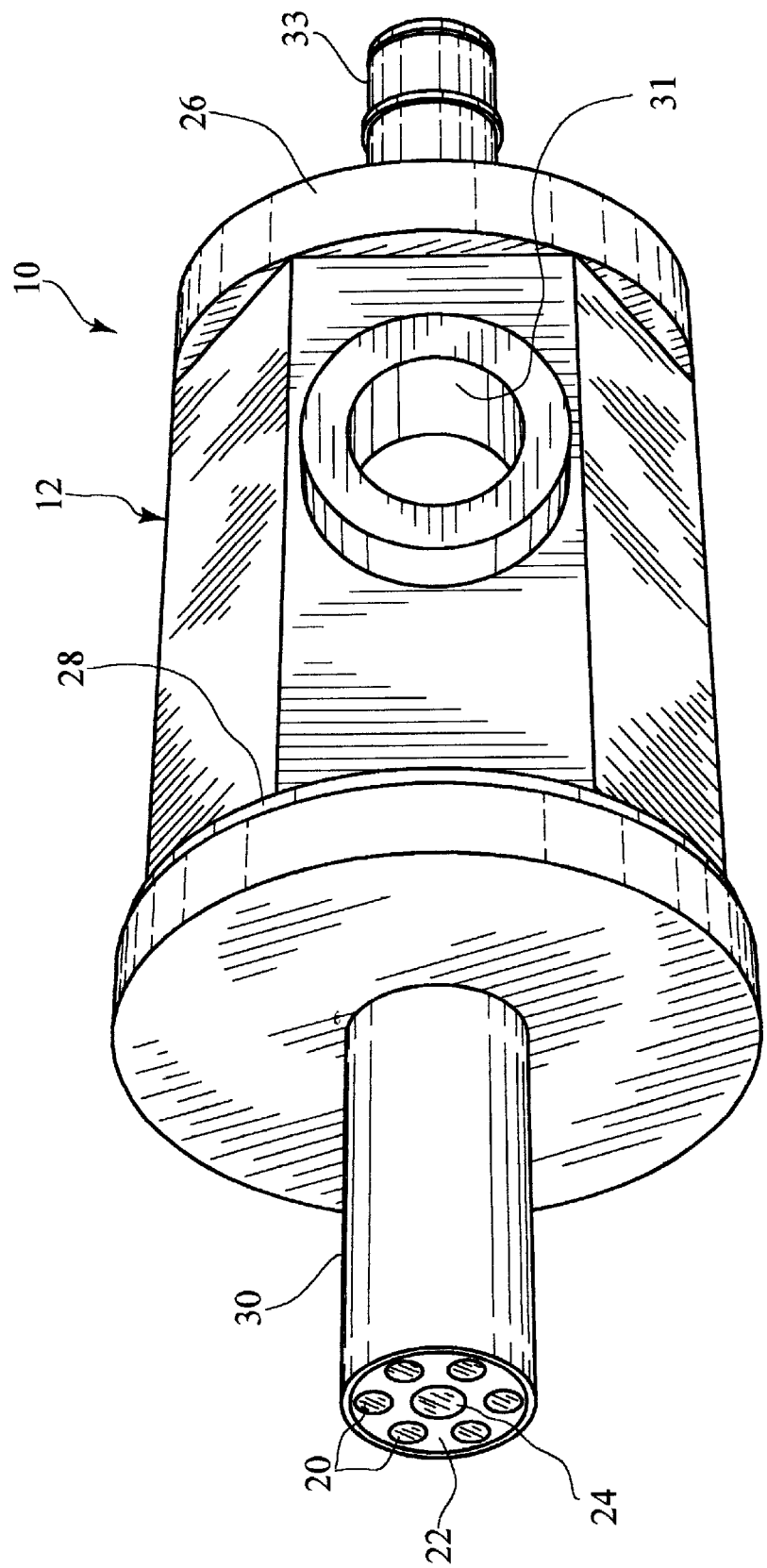
FIG. 1 is a perspective view of an illuminating and viewing unit formed in accordance with a preferred embodiment of the present invention.
Figure 2:
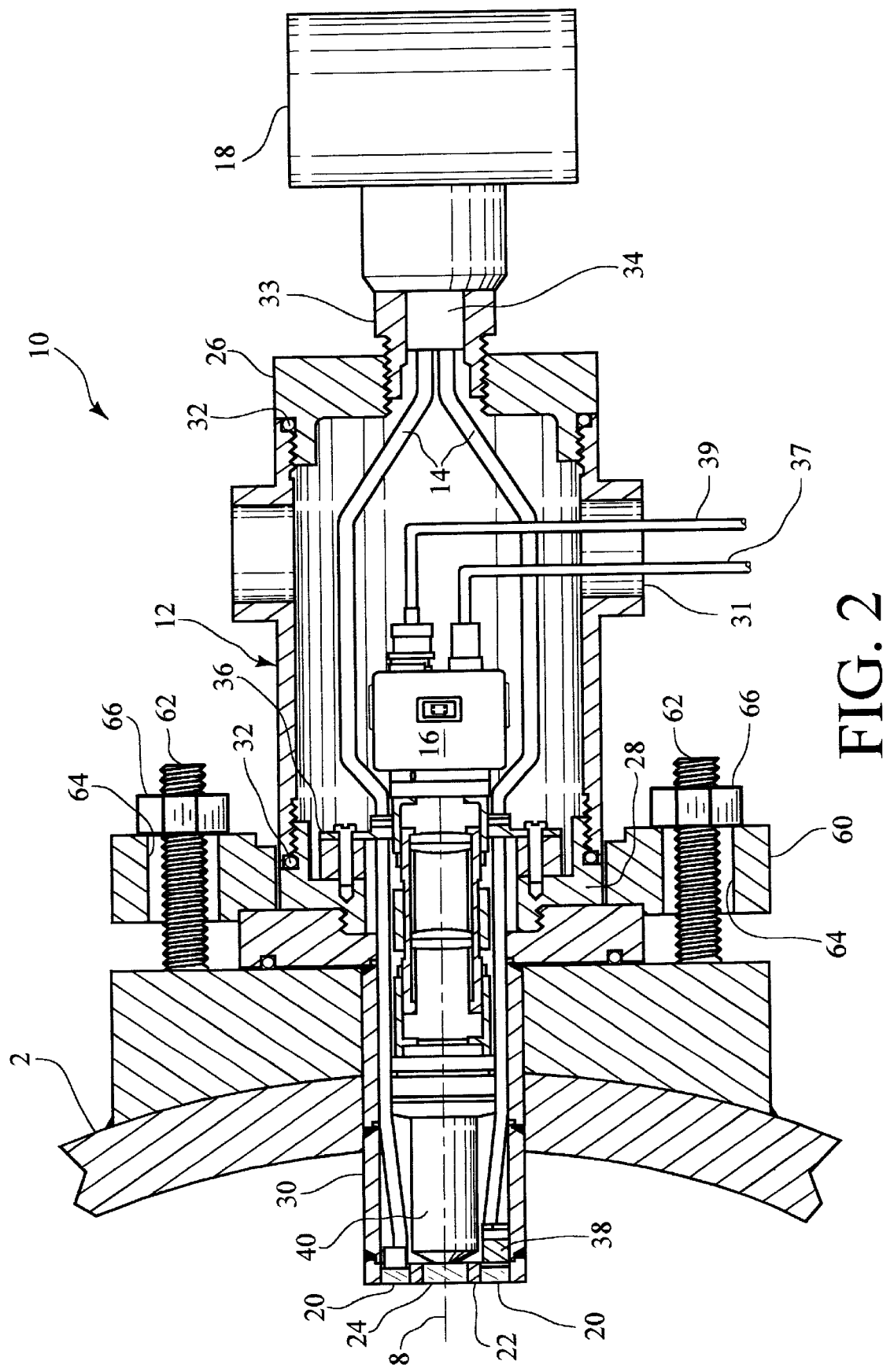
FIG. 2 is a cross-sectional view of the illuminating and viewing unit shown in FIG. 1, also showing attachment of the unit to a vessel and connection of a light source to the unit.

Attention is directed initially to FIGS. 1 and 2 of the drawings, wherein an illuminating and viewing unit formed in accordance with a currently preferred embodiment of the present invention is shown and designated generally by reference numeral 10. By way of overview, illuminating and viewing unit 10 comprises a housing 12, a plurality of radiation guides 14 supported by housing 12 to extend therethrough, and a radiation detector 16 contained in housing 12. Radiation guides 14 serve to carry source radiation from a radiation source 18 to a plurality of respective illumination ports 20 provided in a front wall 22 of housing 12 situated directly adjacent the interior of a vessel, and radiation detector 16 is arranged along a detection path 8 that passes through a detection port 24 in front wall 22 to receive detectable radiation coming from the vessel interior. For purposes of the present invention, the term "radiation detector" is intended to encompass, without limitation, any device used to sense radiated energy, including photosensitive elements and arrays responding to infra-red light, visible light, and ultra-violet light; ultrasound imaging devices; radar sensors; and nuclear radiation sensors. Also for purposes of the present invention, the term "radiation guide" is intended to encompass, without limitation, any device used to constrain or guide radiation along a defined path without significant energy loss, including optical wave guides, light pipes, fiber optic bundles, and the like. The term "illuminate," as used herein in its various forms, refers to application of radiation in any form, as opposed to just light, to a subject. Similarly, the term "view," as used herein in its various forms, refers to detection of radiation generally, and is not limited to detection of light.

In accordance with the present invention, and as a departure from the teaching of U.S. Pat. No. 5,230,556, the design of front wall 22 provides one or more illumination ports 20 that are optically separated from detection port 24. More specifically, and with reference to FIG. 3, front wall 22 is formed of a material that does not transmit the particular source radiation. Where the source radiation is light, as in the present embodiment, front wall 22 is preferably formed of metal such as aluminum, stainless steel, alloy steel, ceramic, plastic or the like to provide opaqueness, strength, and resistance to corrosion. Six illumination ports 20 are arranged at regular angular intervals about a centrally located detection port 24.

Illumination ports 20 are formed of a material that transmits the particular source radiation and preferably exhibits strength and corrosion resistance. By way of example, illumination ports 20 can be made of borosilicate glasses, quartz glasses, acrylics, optical grade polymers, and similar transparent or translucent materials. Each illumination port 20 is individually fused at high temperature and pressure in front wall 22 to maintain a hermetic seal between the interior of vessel 2 and the interior of housing 12. The fusing process followed in the present invention is similar to that process described in *Glass Engineering Handbook, Third Edition,* Chapter 5, (1984) Library of Congress ISBN 0-07-044823-X by G. W. McLellan and E. B. Shand. Illumination ports 20 are depicted as plano-plano lenses in FIG. 3, however other lens configurations can be used depending upon the application. For example, if divergence of an illumination beam of source radiation is desired, the associated illumination port 20 can be a biconcave, plano-concave, or negative meniscus lens. Conversely, if convergence of an illumination beam of source radiation is desired, the associated illumination port 20 can be a biconvex, plano-convex, or positive meniscus lens. Individual lenses may also be fitted with protective, laminated or unlaminated covers to guard against corrosion, fiber light and/or change lens optics on the internal side of the unit.

Detection port 24 is formed of a material that transmits detectable radiation coming from the interior of vessel 2. The detectable radiation can be the same as the source radiation or different from the source radiation, depending on the application. Accordingly, detection port 24 can be manufactured from a material transmitting the entire spectral range of the source radiation for enabling detection of specular and diffuse reflections of source radiation by the interior contents of the vessel. As an alternative, detection port 24 can be manufactured from a material which filters out unwanted spectral regions from radiation to be detected, or which transmits only a chosen wavelength of light. For instance, if the source radiation is of a shorter wavelength intended for fluorescence excitation, and the detectable radiation of interest is longer wavelength fluorescence, then detection port 24 can be chosen to transmit only longer wavelengths of interest.

It is noted that the particular arrangement of illumination ports 20 and detection port 24 in the presently described embodiment is subject to change depending upon the specific application. For example as few as one, or more than six, illumination ports 20 can be provided in any pattern of locations in front wall 22, and detection port 24 can be off-center.

As can be seen in FIG. 2, housing 12 includes a threadably attached rear cap 26, a threadably attached front cap 28, and an insertion assembly 30 threadably mounted on front cap 28. O-rings 32 are provided for improved sealing at the threaded connections of rear cap 26 and front cap 28 to housing 12, and a passage 31 for electrical connection lines is provided through the housing wall. Radiation source 18 is shown schematically as being located externally of housing 12, however it is also possible for radiation source 18 to be located within housing 12. Radiation source 18 can be a bulb or other radiant energy producing means. In the present embodiment, radiation source 18 is a light source mounted on an external coupling member 33 and radiation guides 14 are optical fibers of a fiber optic bundle 34 connected to radiation source 18. For example, a light source as described in U.S. Pat. No. 4,746,178 is suitable for use with the present invention.

The radiation guides 14 are arranged to extend through rear cap 26, around the outside of radiation detector 16, through associated holes in a retaining bracket 36 fastened to front cap 28, and along the inner wall of insertion assembly 30 toward front wall 22. A holder 38 is provided to secure the distal ends of radiation guides 14 proximate to or against an inner surface of an associated illumination port 20.

Radiation detector 16 can be any suitable device for sensing radiation transmitted through detection port 24 from the interior of vessel 2, and can be chosen based on the specific application. In the exemplary embodiment described herein, radiation detector 16 is a color CCD camera that transmits image signals to a remote monitor (not shown) over signal cable 39 and is connected to a power source by a power cable 37. Commonly owned U.S. Pat. No. 5,230,556 provides a detailed description of a preferred camera apparatus for making the present invention, and is explicitly incorporated by reference in this specification. A lens system 40 is located in detection path 8 behind detection port 24 for transmitting radiation back to radiation detector 16. Numerous types of lens systems are available and suitable for use in practicing the present invention, including but not limited to wide angle, narrow angle, zoom, telephoto, and phase contrast lens systems.

Figure 3:
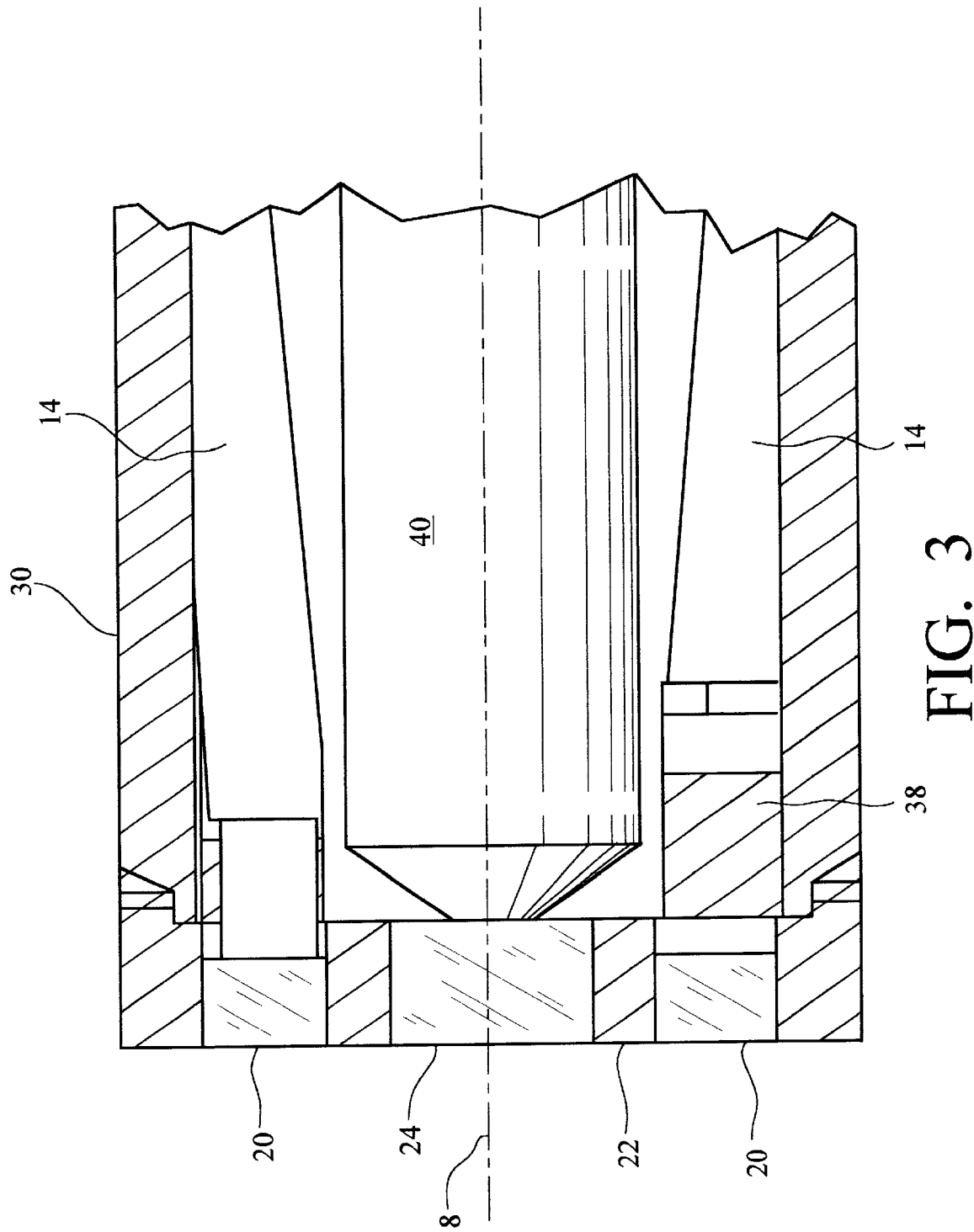
FIG. 3 is an enlarged cross-sectional view of a forward portion of an insertion assembly of the unit shown in FIGS. 1 and 2, illustrating a front wall of the unit having separately fused illumination and detection ports.

It will be appreciated from FIGS. 1 and 3 that the size and thickness of illumination ports 20 are independent of the size and thickness of detection port 24. Consequently, certain advantages are gained over the prior art. Since each of the illumination ports 20 and the detection port 24 are separately formed and fused in front wall 22, an improved pressure rating can be achieved as compared with a single fused window of larger size; in typical configurations, the diameter of fused glass is reduced by at least three times relative to comparable prior art configurations. Alternatively, illumination ports 20 and detection port 24 can be made thinner than a single window of the prior art while nevertheless achieving an equal pressure rating. Under this latter approach, wide-angle illumination configurations and wide-angle detection configurations are improved. Moreover, the illumination angle and detection angle of the system are completely independent of each other and can be simultaneous maximized without deleterious effect on the other.

Illuminating and viewing unit 10 is mounted on a vessel in any conventional manner with front wall 22 directly adjacent the interior of the vessel. FIG. 2 shows one possible arrangement for mounting illuminating and viewing unit 10 on a vessel 2, wherein a retaining flange 60 fits around housing 12 and engages insertion assembly 30, and connection studs 62 on vessel 2 pass through bolt holes 64 in the retaining flange such that unit 10 can be clamped to the vessel by tightening nuts 66 on studs 62. It will be realized, however, that many alternative means and configurations for mounting unit 10 on a vessel exist, including but not limited to other flanged connections, direct threaded connections wherein threads are provided on insertion assembly 30 and in the vessel aperture, TRI-CLOVER® connections, and the like.

What is claimed is:

1. An illuminating and viewing unit for observing matter in the interior of a vessel by supplying source radiation thereto, said unit comprising:

a housing including a front wall formed of a material that does not transmit said source radiation;

mounting means for attaching said housing to said vessel such that said front wall is directly adjacent said interior of said vessel;

at least one illumination port fixed in said front wall, said at least one illumination port being formed of a material that transmits said source radiation;

radiation guide means supported by said housing for supplying said source radiation to said at least one illumination port such that said source radiation is transmitted through said at least one illumination port to said interior of said vessel;

a detection port fixed in said front wall and spaced from said at least one illumination port, said detection port being formed of a material that transmits detectable radiation; and detection means arranged in said housing for sensing radiation transmitted through said detection port from said interior of said vessel.

2. The illuminating and viewing unit according to claim 1, wherein said at least one illumination port is a plurality of illumination ports.

3. The illuminating and viewing unit according to claim 2, wherein said detection port is centrally located with respect to said plurality of illumination ports.

4. The illuminating and viewing unit according to claim 1, wherein said at least one illumination port has a different thickness than said detection port.

5. The illuminating and viewing unit according to claim 4, wherein said at least one illumination port is thinner than said detection port.

6. The illuminating and viewing unit according to claim 5, wherein said at least one illumination port has a smaller surface area facing said interior of said vessel than said detection port.

7. The illuminating and viewing unit according to claim 1, wherein said front wall is formed of metal.

8. The illuminating and viewing unit according to claim 7, wherein said at least one illumination port is formed of glass and said glass is fused with said metal.

9. The illuminating and viewing unit according to claim 7, wherein said detection port is formed of glass and said glass is fused with said metal.

* * * * *